United States Patent

[11] 3,585,537

[72] Inventors Robert C. Rennick
Center Valley;
Warren L. Smith, Allentown, both of, Pa.
[21] Appl. No. 797,837
[22] Filed Feb. 10, 1969
[45] Patented June 15, 1971
[73] Assignee Bell Telephone Laboratories, Incorporated
Murray Hill, Berkeley Heights, N.J.

[54] ELECTRIC WAVE FILTERS
5 Claims, 19 Drawing Figs.

[52] U.S. Cl. .......... 333/72,
[51] Int. Cl. .......... H03h 9/32
[50] Field of Search .......... 333/72, 30; 310/8.2, 8.5, 9.5

[56] References Cited
UNITED STATES PATENTS
3,222,622 12/1965 Curran .......... 333/72
3,384,768 5/1968 Shockley .......... 310/9.5
2,988,714 6/1961 Tehon .......... 333/72
3,437,848 4/1969 Borner et al. .......... 310/8.2
3,456,214 7/1969 Bies .......... 333/72

*Primary Examiner*—Herman Karl Saalbach
*Assistant Examiner*—C. Baraff
*Attorneys*—R. J. Guenther and Edwin B. Cave

ABSTRACT: Multiresonator monolithic crystal structures are coupled to each other at predetermined coupling coefficients K by means of coupling capacitors that shunt the respective structure's resonators to be coupled. The total capacitance coupling the resonators has a value $C_C=C_1/K$ where $C_1$ is the equivalent motional capacitance of the resonators. The capacitor-coupled resonators, when uncoupled, exhibit frequencies $f_0$ $1-K$, where $f_0$ is the filter's midband frequency.

INVENTORS R. C. RENNICK
W. L. SMITH
BY
Leo Stanger
ATTORNEY

ELECTRIC WAVE FILTERS

This application relates to the copending application Ser. No. 558,338, filed June 17, 1966, of W. D. Beaver and R. A. Sykes, assigned to the assignee of the present invention. The application also relates to the application of R. L. Reynolds and R. A. Sykes, Ser. No. 723,676, filed Apr. 24, 1968 and I. E. Fair and E. C Thompson, Ser. No. 771,843, filed Oct. 30, 1968, all assigned to the same assignee as this application.

BACKGROUND OF THE INVENTION

This invention relates to energy transfer devices and particularly to crystal filters.

According to the beforementioned applications, low-loss transmission of energy through an acoustically resonant crystal wafer vibrating in the thickness shear mode is selectively controlled by covering the opposite faces of the wafer with a number of spaced electrode pairs whose masses are sufficient to concentrate the thickness shear vibrations between the electrodes of each pair so that the pairs form separate resonators with the crystal, and by spacing the pairs far enough so that the coupling between any two adjacent resonators is less than a given amount.

According to an aspect of the beforementioned application, these capabilities may be exploited to form a filter that controls the passband between an electric source and a resistive load. This is accomplished by vapor depositing two or more pairs of electrodes on opposite faces of a piezoelectric crystal wafer. When one pair is connected to a source capable of exciting thickness shear vibrations in the wafer, and when another pair is connected to a resistive load, the pairs form successive resonators with the wafer. The passband at the load can be predetermined by suitably selecting the masses of the electrodes and the spacing between the respective resonators. Specifically, it requires making the electrodes sufficiently massive and spacing them far enough apart so that the coupling between adjacent resonators is at least small enough to be in what is called herein the "controlled-coupling" condition. Resonators in this condition have also been called "-definitively coupled."

The controlled-coupling condition becomes evident when the difference between the two short circuit series resonant frequencies exhibited by any two adjacent resonators alone is less than the difference between the so-called series resonant and parallel antiresonant frequencies of one resonator alone.

The short circuit series resonant frequencies are the series resonant frequencies measured by short circuiting one coupled resonator to be tested and exciting the other, while decoupling all others not being tested.

In order to have such filters achieve specific transmission functions, particularly to accentuate the steepness of the sidebands, the number of resonators, or poles, has been increased to as many as eight or twelve. In such higher-order monolithic crystal filters it is possible to attain the specific resonator-to-resonator couplings $K_{1,2}$, $K_{2,3}$,.....$K_{n-1,n}$, that any given transmission function H(z) defines. However, to realize such higher-order monolithic crystal filters requires the use of large piezoelectric wafers, such as of quartz. These are difficult to make and are much more expensive than lower-order filters.

THE INVENTION

According to the invention, these difficulties are obviated by interposing between resonators of separate lower order monolithic crystal filter structures, a shunt reactance X that couples the resonators as loosely as the coupling K between the two similar resonators in a higher-order filter on a single crystal plate. At the same time the shunted resonators are tuned to obviate the detuning effect of the reactance and to maintain the mesh center frequencies $f_0$. Preferably, the reactance is a capacitor.

According to still another feature of the invention the crystal structures each have a pair of resonators and the capacitance shunts the resonators of adjacent crystal structures. Preferably, the capacitance of the capacitor is adjusted to take account of the electrostatic capacitances in each resonator.

More specifically, the value of each shunt reactance X is $KX_1$, where $X_1$ is the reactance of the equivalent motional inductances $L_1$ of the resonator when it is uncoupled and tuned to the center frequency $f_0$ of the filter. The capacitor-coupled resonators at the same time are tuned to exhibit frequencies, when decoupled, of $f_0\sqrt{1-K}$.

These and other features of the invention are pointed out in the claims. Other objects and advantages of the invention will become known from the following detailed description when read in light of the accompanying drawings.

DESCRIPTION OF PREFERRED EMBODIMENTS

Figure 1:
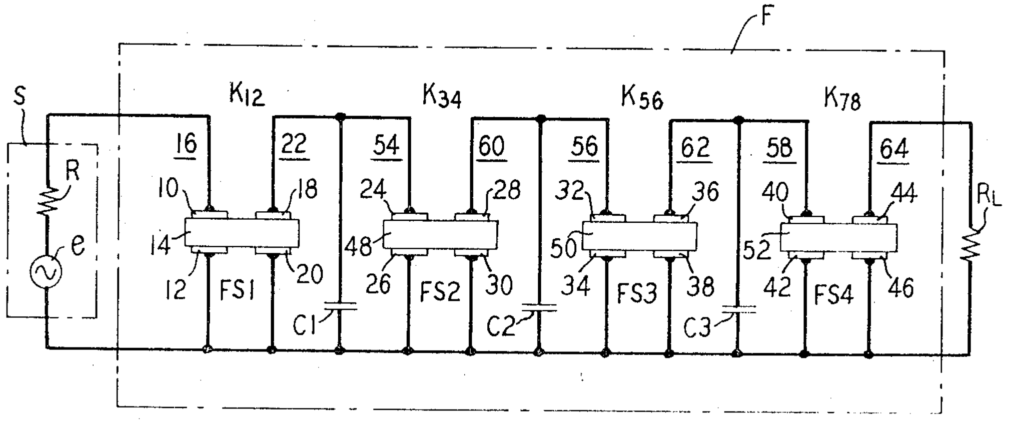
FIG. 1 is a schematic diagram illustrating a filter embodying features of the invention.

In FIG. 1 a high frequency energizing source S which exhibits a high frequency voltage $e$ and an internal resistance R, energizes a load $R_L$ through an eight-resonator band-pass filter F embodying features of the invention. The filter F is composed of four sequentially coupled two-pole monolithic crystal filter structures FS1, FS2, FS3, and FS4 all operating in the thickness shear mode.

The source S energizes the structure FS1 by applying electrical energy to electrodes 10 and 12. These are mounted to piezoelectrically excite thickness shear vibrations in a piezoelectric crystal wafer 14 and to form therewith a first resonator 16. The wafer may, for example, be quartz cut in the AT crystallographic direction. The vibrations in the wafer 14 piezoelectrically excite electrical oscillations in electrodes 18 and 20 that form with the wafer 14 a second resonator 22 in the structure FS1. Electrodes 24, 26, 28, 30, 32, 34, 36, 38, 40, 42, 44, and 46 mounted on respective crystal wafers 48, 50 and 52 form three respective resonators 54, 56, and 58 that correspond to the resonator 10 and three resonators 60, 62, and 64 which correspond to the resonator 22.

A shunt capacitor C1 couples the electrical signals appearing at the electrodes 18 and 20 to the electrodes 24 and 26 so as to excite the resonator 54. The resulting thickness shear vibrations in wafer 48 excite the resonator 60. A shunt capacitor C2 couples the resonator 60 to the resonator 56. The thickness shear vibrations therein, in turn, corresponding to the operation in the filters FS1 and FS2, excite the resonator 62. A capacitor C3 couples the electrical energy in resonator 62 to the resonator 58 in the same manner. The electrical energy resulting at electrodes 44 and 46 from thickness shear vibrations of the wafer 52 is applied across the load resistor $R_L$. Load resistor represents any resistive load to which energy must be applied.

The masses of the electrodes 10, 12, 18, and 20 mounted on the wafer 14 in the filter MF1 are sufficiently great, and the respective electrode pairs 10, 12 and 18, 20 are spaced from each other so that the resonators 16 and 22 are in what is here termed the "controlled-coupling" condition. This condition may be characterized in several ways. When it exists the masses of the electrodes 10, 12, 18 and 20, or the total thickness of the structure at the electrodes, are sufficiently great so as to "trap" or concentrate the energy of vibrations in the wafer 14 to the volume of the wafer between the electrodes of each resonator, and to attenuate the energy exponentially with distance away from the electrode pair. This limits the effect of the wafer boundaries upon vibrations within the wafer. At the same time, in the controlled-coupling condition the spacing between the resonators combined with the degree of mass loading in each structure FS1, FS2, FS3 and FS4 is such as to couple the pairs loosely. Specifically, it is such as to couple the pairs loosely enough so that the resonant frequencies $f_A$ and $f_B$ exhibited between coupled resonators when one resonator is energized and the other short circuited, are closer to each other than $f_{aA}-f_A$ and $f_{aB}-f_B$. The values $f_{aA}$ and $f_{aB}$ are antiresonant frequencies exhibited by the resonators when they are connected in parallel or cross-connected in parallel.

More specifically, the coupled resonators are coupled to less than one-half of the maximum coupling in the controlled-coupling condition. That is, the resonant frequencies are separated by less than $\frac{1}{2}(f_{aA}-f_A)$ or $\frac{1}{2}(f_{aB}-f_B)$. The resonators 54 and 60, 56 and 62, 58 and 64 are also in the controlled-coupling condition. More specifically, they are also coupled to less than one-half of the maximum coupling in the controlled-coupling condition. Such crystal structures are described in detail in the copending applications previously mentioned.

The coefficient of coupling K between any two resonators in a narrow band structure, coupled only to each other, may be measured in terms of the coupled frequencies by $$K=\frac{f_B-f_A}{\sqrt{f_Bf_A}}$$

The coupling coefficients $K_{12}$ between resonators 16 and 22 and the coefficients of coupling $K_{34}$, $K_{56}$, and $K_{78}$ between the resonators 54 and 60, 56 and 62, 58 and 64, is selected to achieve a predetermined passband characteristic, or transmission function H(z), for any eight successively coupled resonators. H(z) defines these couplings. Thus, the coefficients of coupling $K_{23}$, $K_{45}$, and $K_{67}$ between resonators 22 and 54, 60 and 56, and 62 and 58 are selected in the same manner. For any particular desired passband, the value of capacitor C1 is sufficiently large to make the coupling loose enough to be less than the maximum coupling in the controlled-coupling condition and preferably less than half the maximum coupling of the controlled-coupling condition.

With the capacitors C1, C2, and C3, which produce coupling coefficients $K_{23}$, $K_{45}$, and $K_{67}$, the uncoupled resonant frequencies of the resonators 22, 54, 60, 56, 62, and 58 are made to be lower than the center frequency $f_O$. They are low enough to keep the frequency in the mesh formed by adjacent capacitor-coupled resonators, while they are coupled, at the center frequency $f_O$.

The fraction of the frequency $f_O$ to which the resonators 22 and 54, 60 and 56, and 62 and 58 are tuned is respectively $\sqrt{1-K_{23}}$, $\sqrt{1-K_{45}}$, and $\sqrt{1-K_{67}}$. This constitutes frequency lowerings Δf from $f_O$ of approximately $f_OK_{23}/2$ for resonators 22 and 54, $f_OK_{45}/2$ for resonators 60 and 56, and $f_OK_{67}/2$ for resonators 62 and 58.

Figure 2:
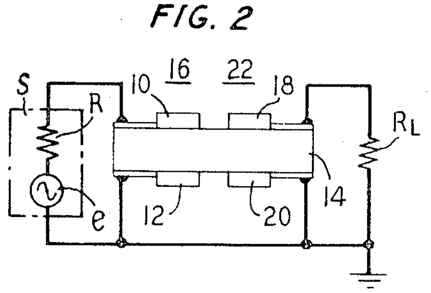
FIG. 2 is a schematic diagram of a filter section similar to that in FIG. 1.
Figure 3:
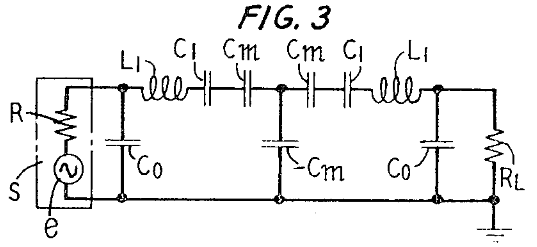
FIG. 3 is the ladder equivalent circuit of the structure in FIG. 2.
Figure 4:
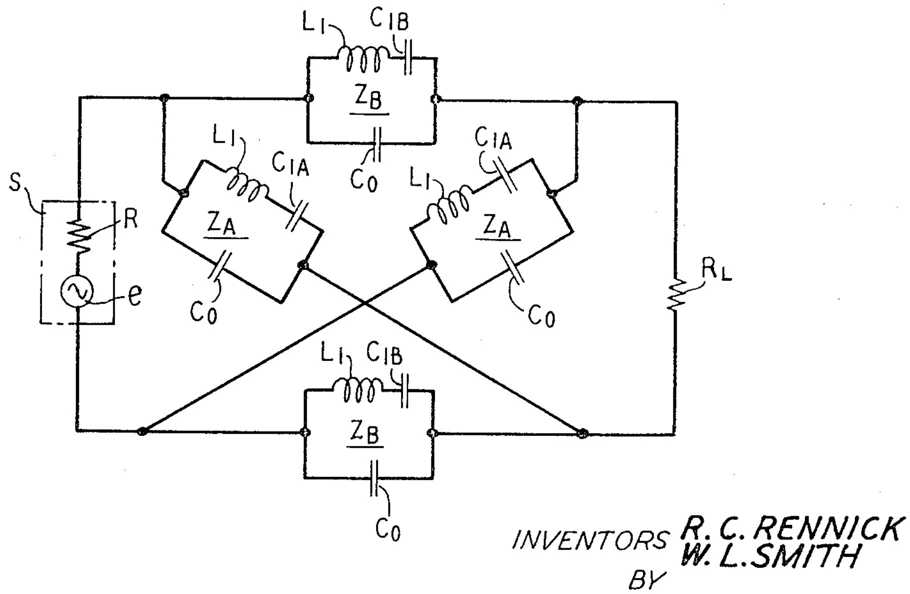
FIG. 4 is a schematic diagram illustrating the lattice equivalent circuit of the circuit in FIG. 2.

The effects of structures such as FS1 can be appreciated by considering a similar structure in the environment of FIG. 2. In FIG. 2 the electrodes 18 and 20 are identical to 10 and 12. A ladder equivalent of this circuit appears in FIG. 3. The lattice equivalent circuit appears in FIG. 4. In the ladder equivalent network the three positive and negative capacitors $C_m$ represent the electrical equivalent of the acoustical coupling between the electrode regions of FIG. 2. Here, for any desired coupling K, $$C_m=\frac{C_1}{K}$$

where $C_1$ is the equivalent motional capacitance of each resonator. This relationship is available from the coupling formulae that define any reactive coupling Tee. According to Bartlett's bisection theorem the circuits of FIGS. 3 and 4 are related to each other by the following equations:

$$C_{1A}=\frac{C_1}{1-\frac{C_1}{C_m}}$$

$$C_{1B}=\frac{C_1}{1+\frac{C_1}{C_m}}$$

The values $C_1$ and $L_1$ are such that the tuning frequency of each resonator when uncoupled is $\frac{1}{2}\pi\ L_1C_1$, and is equal to $f_O$, the overall center frequency $f_O$. The equivalent motional inductance $L_1$ is a function of the crystal body thickness and the geometry of electrodes 10, 12, and 18, 20. Capacitance $C_O$ is the static interelectrode capacitance of each pair of electrodes.

In FIG. 2 the signal transferred by the structure is greatest, and hence the insertion loss is least, when the characteristic impedance, i.e. the image impedance, $Z_C$ is equal to $R_L$. Thus maximum signal transfer and minimum insertion loss occur at those frequencies when $Z_C$ exhibits resistive values $R_C$, i.e. when it is real and positive, so that $Z_C=R_C=R_L$. Generally, the characteristic impedance $Z_C=\sqrt{Z_{OC}Z_{SC}}$, where $Z_{OC}$ is the input impedance when the load end is open-circuited and $Z_{SC}$ is the input impedance when the load end is short-circuited. Thus the characteristic impedance $Z_C$ for the crystal structure of FIG. 2 and its equivalent circuits of FIGS. 3 and 4 is equal to $\sqrt{Z_AZ_B}$. Since the crystal wafer 18 has a large Q, the values $Z_A$ and $Z_B$ are almost exclusively comprised of their component reactances $X_A$ and $X_B$. Thus the characteristic impedance $Z_C$ is substantially equal to $\sqrt{X_AX_B}$. The values $X_A$ and $X_B$ can be plotted and the values of $Z_C$ determined therefrom for various masses of electrodes 10, 12 and 14, 16.

Figure 5:
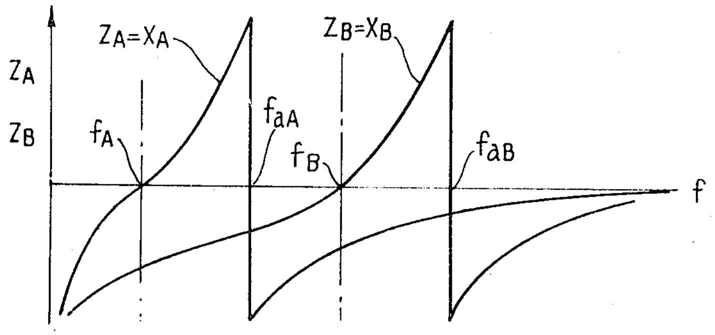
FIG. 5 is a diagram illustrating the change in reactance with frequency for the series and shunt impedances in the circuit of FIG. 4 when resonators in FIG. 2 are tightly coupled.

In the crystal structure of FIG. 2 when the wafer 14 is insignificantly mass loaded by the electrodes 10, 12, 18 and 20, vibratory energy generated between the electrodes 10 and 12 decreases only gradually in other parts of wafer 14. Thus the wafer couples the electrode pairs tightly. The reactances $X_A$ and $X_B$ of the impedances $Z_A$ and $Z_B$ then vary with frequency as shown in FIG. 5.

Since $X_A$ and $X_B$ are imaginary numbers, $\sqrt{X_AX_B}$ is real only if $X_A$ and $X_B$ bear opposite signs. Thus, in the frequency regions in which $X_A$ and $X_B$ appear on opposite sides of the abscissa of FIG. 5, the filter exhibits real positive characteristic impedances $Z_C=R_C$. As shown in the graph of the real portion of $Z_C$, i.e. $R_C$, in FIG. 6 two real positive characteristic impedances $Z_C$, that is characteristic resistances $R_C$, exist for the type of coupling in FIG. 5. They extend, respectively, across the resonant-to-antiresonant ranges $f_A$ to $f_{aB}$ and $f_B$ to $f_{aB}$ of the individual impedances $Z_A$ and $Z_B$. The widths of these ranges are approximately equal and a function of the wafer's piezoelectric coupling.

Figure 6:
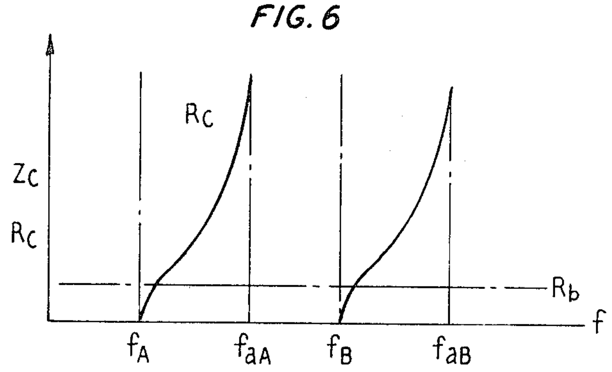
FIG. 6 is a diagram illustrating variations in characteristic impedances for changes in frequency for the circuits of FIGS. 2, 3 and 4 when the conditions of FIG. 5 exist.
Figure 7:
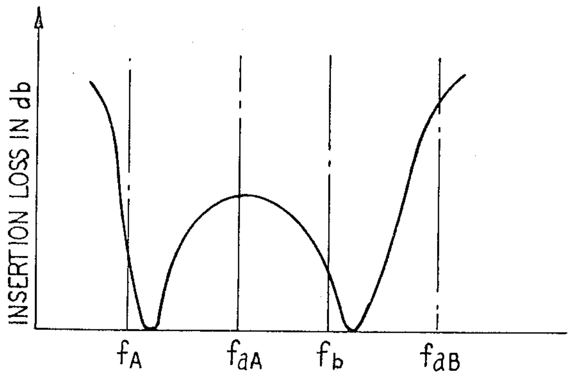
FIG. 7 is a diagram illustrating the transmission characteristics of the circuit in FIGS. 2, 3 and 4 for the conditions in FIGS. 5 and 6.

Since the insertion loss is minimum when the terminating impedance $R_L$ of FIGS. 2 and 6 matches the characteristic resistance $R_C$, the insertion loss for any such device is very high in the reactive impedance region $f_{aA}$ to $f_B$. It is low only at the two frequencies where $R_L$ intersects $R_C$. Resistance $R_L$, no matter what its value, intersects $R_C$ of FIG. 6 in two widely separated places. Thus the curves of FIGS. 5 and 6 produce the insertion loss of transmission characteristic shown in FIG. 7. For any value of $R_O$ this results in two minima separated by a wide band of loss and separated from each other by a gap greater than $f_{aA}-f_A$. Moreover, slight changes in terminating resistance $R_L$ change the frequencies of the minima.

According to the copending applications mentioned before, giving the electrodes sufficient mass concentrates the thickness shear mode vibration energy in the wafer 18 between the electrodes of the respective pairs so that the wafer 18 vibrates with greatly diminishing amplitude outside the volume between the electrodes. Thus, for any particular spacing between electrode pairs, the coupling between the resonators decreases. Conversely, with significant electrode masses, increasing the spacing between pairs decreases the coupling. Also, significant energy does not reach the boundaries of the wafer. When these two resonators are placed in each other's effective field, they operate similar to a tuned transformer.

For these reasons, increasing the distances between the electrode pairs and increasing the masses of the electrode pairs reduces the band spectrum through which the energy of the system of one pair passes through the system of the other pair. When this happens the resonant frequencies $f_A$ and $f_B$ approach each other. When the coupling is low enough so that $f_B$ is less than $f_{aA}$, the individual reactance curves $X_A$ and $X_B$ appear as in FIG. 8. There, the individual resonant-to-antiresonant ranges of $X_A$ and $X_B$ overlap. Otherwise stated, $f_B-f_A<f_{aA}-f_A$. The resulting real portion of the image impedance $Z_C$, that is characteristic resistance $R_C$, appears in the real plane of FIG. 9. As shown in FIG. 9 the impedance $Z_C$ possesses two positive real ranges. One range extends between the resonant frequencies $f_A$ and $f_B$ and has an intermediate maximum R with zero extremes. A second range lies between $f_{aA}$ and $f_{aB}$. There $R_C$ starts at infinity, drops and returns to infinity as the frequency rises.

One of the two frequency ranges of FIG. 9 can be rejected by terminating the electrodes 14 and 16 within the resistance range of one characteristic resistance $R_C$ curve but remote from the other. Since in FIG. 9 $R_L$ closely matches all resistances less than $Z_O$, the system passes the frequencies between $f_A$ and $f_B$ with little loss. A curve showing the insertion loss for a filter exhibiting these conditions, and loaded with a resistance $R_L$, appears in FIG. 10.

Figure 9:
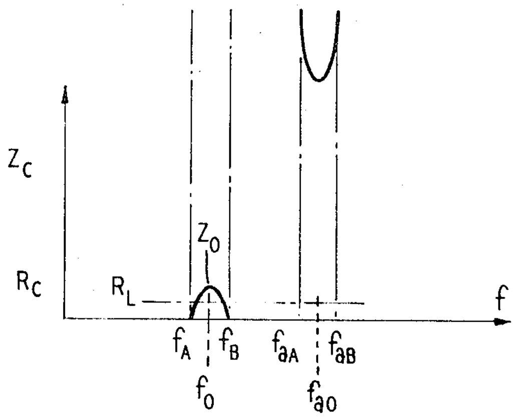
FIG. 9 is a diagram illustrating variation in characteristic impedances of the filter structure represented in FIGS. 2, 3 and 4 when the conditions of FIG. 8 prevail.
Figure 10:
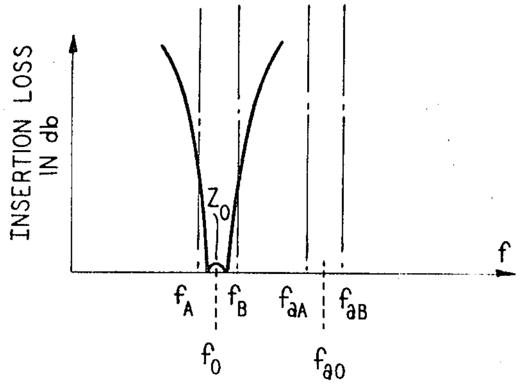
FIG. 10 is a diagram illustrating the transmission characteristics of the filter structure in FIG. 2 when the conditions of FIGS. 8 and 9 prevail.
Figure 11:
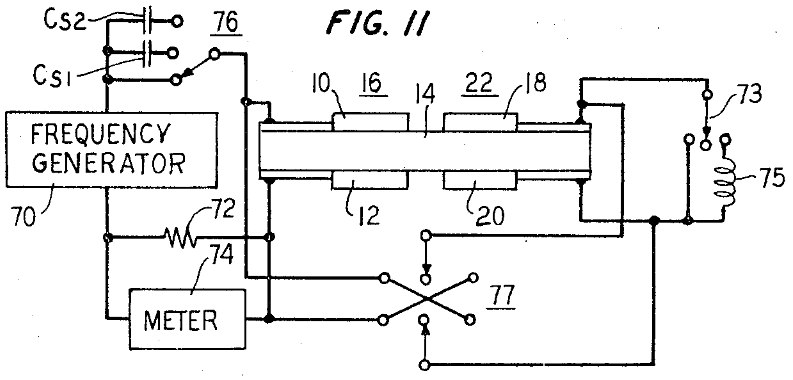
FIG. 11 is a schematic diagram illustrating test circuits for determining the characteristics of the filter structure in FIG. 2.

The conditions of FIGS. 6, 7, 9, and 10 can be ascertained as shown in FIG. 11 by applying a drive voltage from a generator 70 through a resistor 72 to one pair of electrodes 10 and 12, and first short circuiting the other electrodes 18 and 20 through a switch 73. A meter 74 measures the voltage across the resistor 72, the frequencies at which the voltages are highest are the frequencies $f_A$ and $f_B$.

The switch 73 then connects an inductor 75 across electrodes 18 and 20. This detunes the frequency of resonator 22 so that resonator 16 is substantially uncoupled from resonator 22. The frequencies at which the voltage measured across the meter 74 first reaches a peak and then dips are the uncoupled values of $f_O$ and $f_{aO}$. The value of $f_{aO}-f_O$ is substantially the same as $f_{aA}-f_A$ and $f_{aB}-f_B$. Throughout these measurements a switch 76 is set to establish a direct connection between the generator 70 and the electrode 10. A switch 77 remains in the central position as shown.

The frequency $f_{aA}$ may be determined by noting the frequency at which minimum voltage occurs across meter 74 when the generator 70, with the resistor 72 and meter 74, is applied across resonators 16 and 22 connected in parallel. This requires leaving switch 76 as shown, leaving switch 73 open in the central position, and switching switch 77 to the left. The frequency $f_{aB}$ may be similarly determined when switch 77 is switched to the right.

By switching the switch 73 to the inductor 75, to detune resonator 22, and moving switch 77 to the center, it is possible to obtain measurements of $L_1$ and $C_1$ in FIGS. 3 and 4. This is done by connecting the switch 76 to the series capacitor $C_{S1}$ and measuring the frequency at which meter 74 reads maximum. This is the resonant frequency $f_{S1}$. The switch 76 is then set to series capacitor $C_{S2}$. The maximum reading on meter 76 then indicates that a resonance exists at frequency $f_{S2}$ to which the generator 70 is tuned.

Then $$L_1=\frac{1}{4\pi^2}\left(\frac{1}{f_{S2}^2-f_O^2}-\frac{1}{f_{S1}^2-f_O^2}\right)\frac{1}{C_{S1}-C_{S2}}$$

$$L_1\sim\frac{1}{8\pi^2}\left(\frac{1}{f_{S2}-f_O}-\frac{1}{f_{S1}-f_O}\right)\frac{1}{C_{S1}-C_{S2}}$$

$$C_1=\frac{1}{4\pi^2 f_O^2 L1}$$

Figure 8:
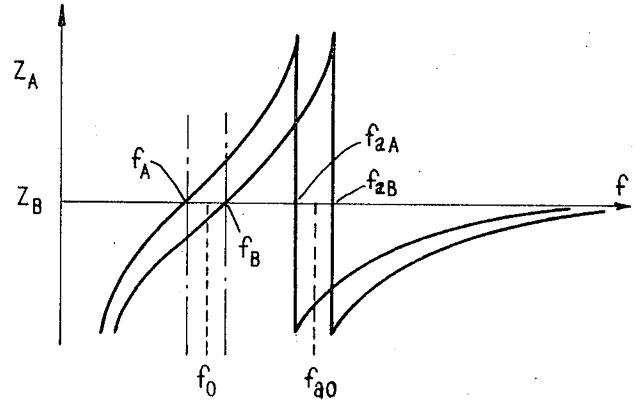
FIG. 8 is a reactance diagram illustrating changes in the reactance of the series and shunt arms in the circuit of FIG. 4 when the resonators of FIG. 2 are coupled loose enough to be in the controlled coupling condition.

If $f_B-f_A$ is less than $f_{aA}-f_A$, the conditions of FIGS. 8, 9 and 10 exist. For convenience, the condition $f_B-f>f_{aA}-f_a$ is known as the beforementioned controlled-coupling condition. If $f_B-f_A$ exceeds or is equal to $f_{aA}-f_A$, the conditions of FIGS. 5, 6, and 7 exist. The coupling coefficient K between these pairs is equal to $(f_B-f_A)\sqrt{f_Bf_A}$. Approximately this is $(f_B-f_A)/f_B$ or $(f_B-f_A)/f_A$.

Figure 12:
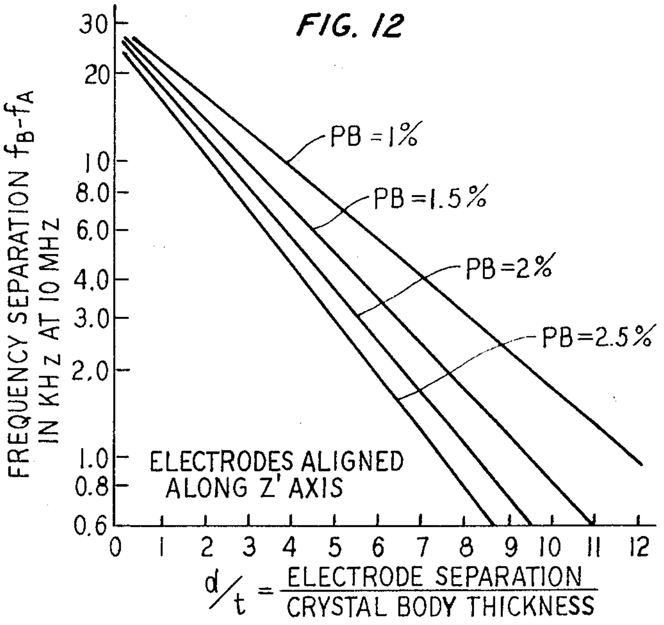
FIGS. 12, 13, and 14 are graphs illustrating the parameter relationships for filter sections such as those of FIG. 2.
Figure 13:
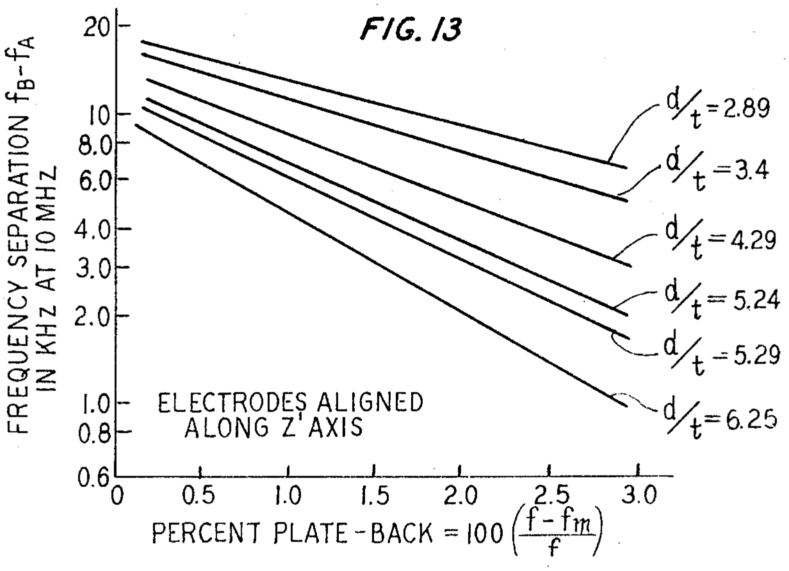
Figure 14:
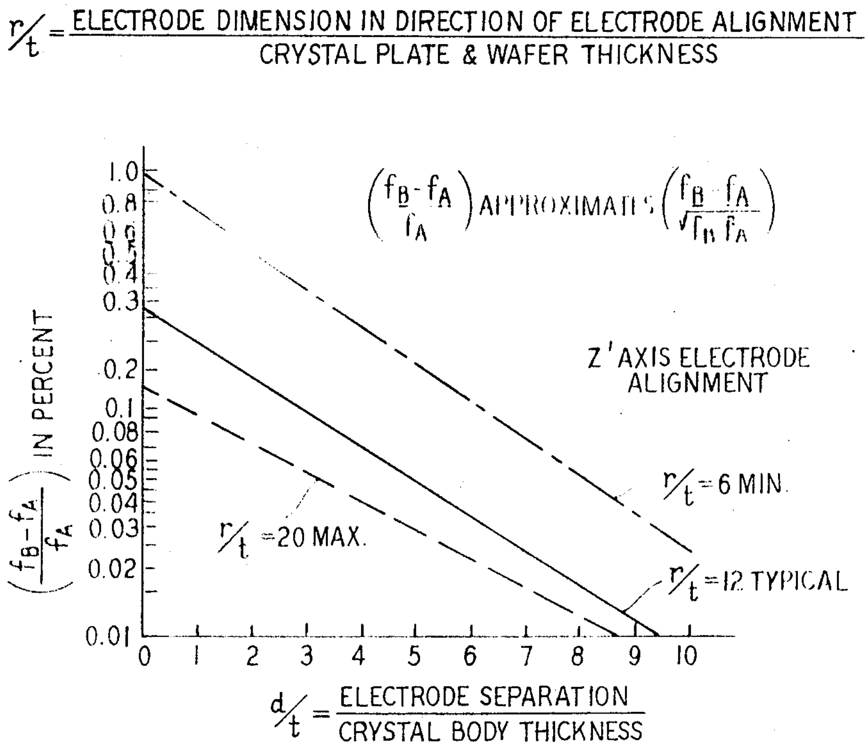

The bandwidth $(f_B-f_A)$ of such a structure is a function of several parameters. The graphs of FIGS. 12, 13, and 14 illustrate empirical relationships between the parameters in one such structure. In these graphs the masses of the electrodes are represented not directly, but by how much the masses lower the frequency of each resonator. Such frequency lowering occurs even for a single pair of electrodes on a crystal wafer. The fractional drop $(f-f_r/f)$ in the resonant frequency $f_r$ of an uncoupled resonator formed by a single pair of electrodes on a crystal wafer, from the fundamental thickness shear mode frequency $f$ of the unelectroded crystal body due to increasing masses of the electrodes, is called plateback.

The plateback or frequency lowering occurs in addition to any frequency shifts resulting from coupling between resonators. For this reason $f_O$ is not the same as $f$. In the curves of FIGS. 12, 13, and 14 the plateback for both resonators is the same. However, it is possible to detune each resonator by varying the plateback of one or the other. In FIG. 3 this has the effect of adding a reactance such as a capacitance, in parallel or in series with the inductor $L_1$ and capacitor $C_1$. Preferably, to obtain a center frequency $f_O$ both resonators, when uncoupled are tuned to $f_O$.

In FIG. 1 the resonators 16 and 22, 54 and 60, 56 and 62, and 58 and 64, when the filters MF1 to MF4 are unconnected, are all in the controlled-coupling condition where $f_A-f_B<f_{aA}-f_A$. That is, they follow the rule illustrated in FIGS. 8, 9, and 10. More specifically, they are such that $f_B-f_A<(f_{aA}-f_A)/2$. Thus, $f_A$ and $f_B$ are closer together than to either $f_{aA}$ or $f_{aB}$.

Figure 15:
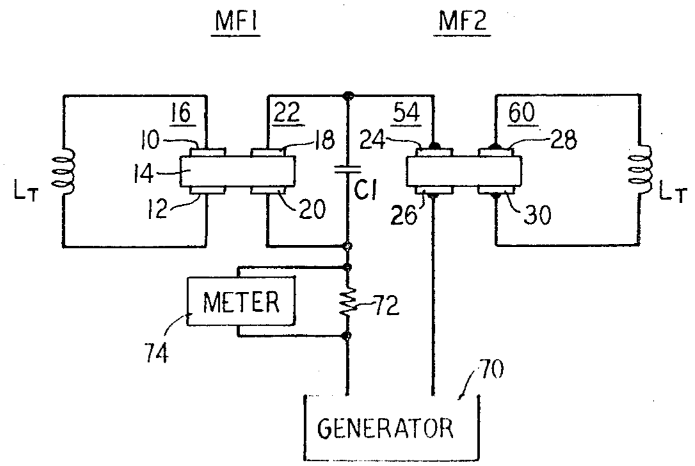
FIG. 15 is a schematic diagram illustrating a test circuit for determining the coupling between filter sections in FIG. 1.

The coupling between resonators, such as 22 and 54, 28 and 56, and 62 and 58 is determined by applying a high frequency signal from a high frequency generator 70 through a measuring resistor 72 into one of the meshes formed by the coupling capacitor such as C1. This is shown in FIG. 15. Here, test inductors $L_T$ detune resonators 10 and 60 to uncouple them. Voltage maxima indicated by the meter 74 across the resistor 72 as the generator frequency varies indicates two resonant frequencies $f_C$ and $f_D$. The coupling between the resonators such as 22 and 54 in FIG. 15 is then equal to $K_{23}=(f-f_D)\ \sqrt{f_Cf_D}$.

In FIG 1 the resonators 22, 54, 60, 56, 62, and 58, when uncoupled, are tuned lower than $f_O$. This is done with backplating. It achieves self resonant frequencies $f_O$ in each mesh, and hence achieves an overall output frequency of $f_O$. At the same time, those predetermined couplings between resonators 18 and 54, 60 and 56, and 62 and 58 that are suitable for an 8-resonator monolithic crystal filter remain the same. This departure of individual resonators from $f_O$ maintains the mechanical couplings between resonators on the same filter structure. It prevents capacitors C1, C2, and C3 from upsetting the predetermined mechanical couplings. The departure from frequency $f_O$ is a fraction of frequency $f_O$ equal to $\sqrt{1-K_{23}}$, $\sqrt{1-K_{45}}$, and $\sqrt{1-K_{67}}$ at capacitors C1, C2, and C3.

Figure 16:
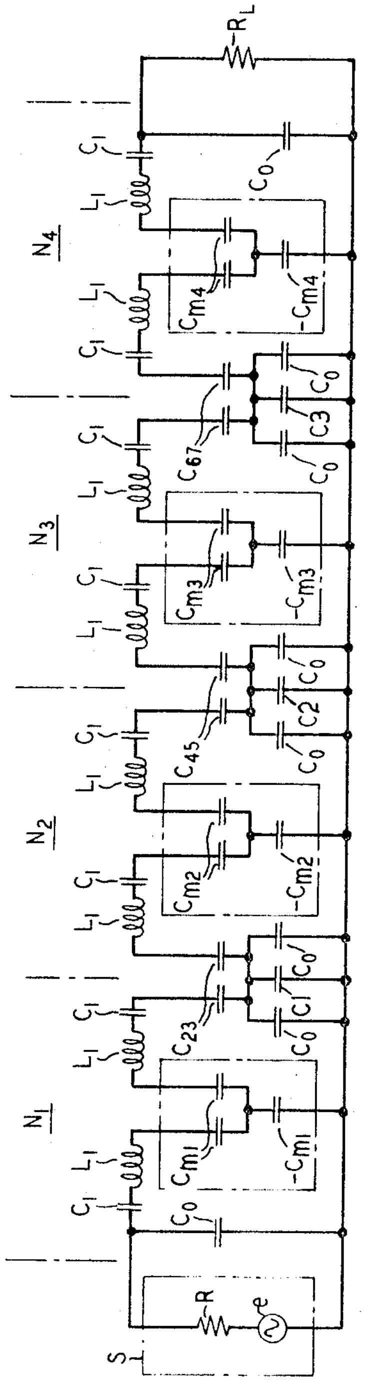
FIG. 16 is a ladder equivalent circuit for the filter of FIG. 1.

That the departure in tuning frequency from $f_O$ has this effect can be seen from further consideration of the operation of FIG. 1, which can be best understood from the ladder equivalent circuit of FIG. 16. This equivalent network is composed of four networks N1, N2, N3, and N4, all corresponding to that of the filter structures FS1, FS2, FS3, and FS4 in FIG. 3. The networks are sequentially coupled by capacitors C1, C2, and C3 and are parallel to two capacitors $C_O$, where $C_O$ represents the static capacitances of one pair of electrodes to which the capacitor $C_1$ or $C_2$ or $C_3$ is connected. The positive and negative capacitors $C_m$ again represent the coupling between the resonators of the respective filter structures. The reactances $L_1$ and $C_1$ represent the equivalent motional inductances and capacitances of the resonators when they are uncoupled and tuned to $f_O$.

The capacitors $C_{23}$, $C_{45}$, and $C_{67}$ represent the detuning of the resonators 22, 54, 60, 56, 62, and 58 from $f_O$. The capacitors $C_{mx}$, where $x=1, 2, 3...$, represent the mechanical couplings with coefficients $K_{12}$, $K_{34}$, $K_{56}$, and $K_{78}$. Thus $C_{m1}=C_1/K_{12}$, $C_{m2}=C_1/K_{34}$, $C_{m3}=C_1/K_{56}$, and $C_{m4}=C_1/K_{78}$. Each Tee circuit composed of capacitors $C_m$ imposes a phase shift of 90° corresponding to the phase shift imposed by the mechanical coupling between the individual resonators of each filter structure.

If the signs on the capacitors $C_m$ were reversed, the phase shift would be reversed. Thus, instead of a 90° phase shift, a 270° phase shift would result. Since the phase shift in one direction or the other is 180° apart, only the polarity of the output is affected. Thus, for analysis it is possible to reverse the polarities of the capacitors $C_{mx}$ and change only the polarity of the resulting output.

Figure 17:
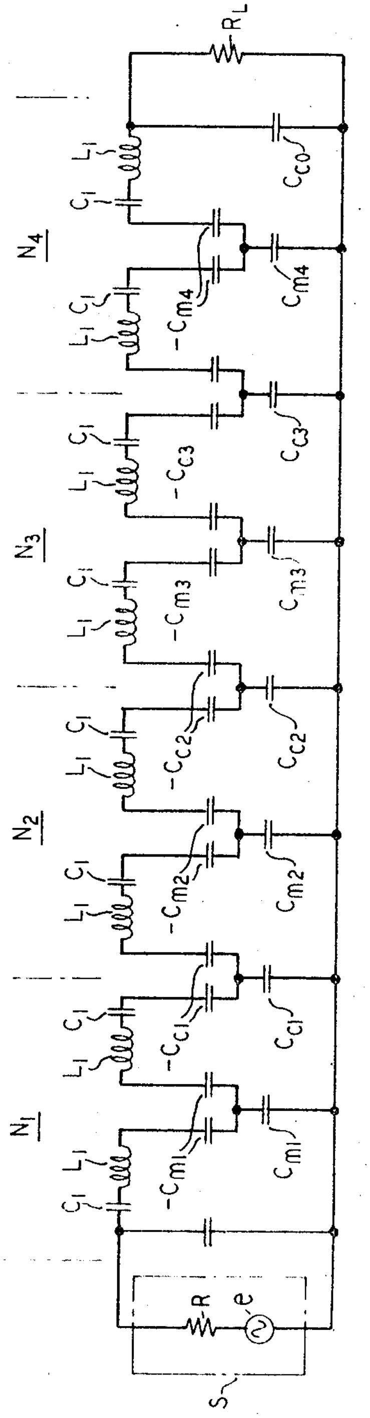
FIG. 17 is a schematic diagram illustrating another equivalent circuit for the filter of FIG. 1.

At the same time it is possible to combine respective capacitors C1, C2, and C3 with their capacitances $C_O$ to form capacitances $C_{C1}$, $C_{C2}$, and $C_{C3}$. The detuning of the resonators 18, 54, 60, 56, 62, and 58 are such that $C_{23}=-C_{C1}$, $C_{45}=-C_{C2}$, and $C_{67}=-C_{23}$. The result of these adjustments appears in FIG. 17. From here it can be seen that the coupling between networks $N_1$, $N_2$, $N_3$, and $N_4$, corresponding to structures FS1, FS2, FS3, and FS4, and represented by the capacitor Tees $C_{C1}$, $C_{C2}$, $C_{C3}$, is identical in form to the mechanical coupling Tees $C_{m1}$, $C_{m2}$, and $C_{m3}$. The form of the Tees with $C_{C1}$, $C_{C2}$, $C_{C3}$ is physically realizable as long as $C_{C1}$, $C_{C2}$, $C_{C3}$ are greater than $C_1$. Thus the detuning of the resonators 18, 54, 60, 56, 62, and 58 and capacitors C1, C2 and C3, in conjunction with static capacitances $C_O$, create the effect of coupling Tees between adjacent, mechanically coupled resonators such as 22 and 54. The coupling between such nonmechanically coupled resonators corresponds to the coupling between the mechanically coupled resonators and produces the effect corresponding to an 8-pole filter.

The values of $C_{C1}$, $C_{C2}$, $C_{C3}$, may be obtained from the desired coupling established between the same resonators in an eight resonator monolithic filter. These couplings may be selected to conform to ordinary Chebyscheff or Butterworth criteria within limits imposed by the maximum definitive coupling. For any desired coupling coefficients $K_{23}$, $K_{45}$ and $K_{67}$, $$C_{C1}=C_1/K_{23},\ C_{C2}=C_1/K_{45},\ \text{and}\ C_{C3}=C_1/K_{67}.$$

Thus $$C1=C_1/K_{23}-2C_O,\ C2=C_1/K_{45}-2C_O,\ \text{and}\ C3=C_1/K_{67}-2C_O.$$

The resonators 18, 54, 60, 56, 62 and 58 are each lowered in frequency to $f_O\ \overline{1-K}$ to maintain the same midband frequency $f_O$.

A filter according to FIG. 1 may have the following dimensions. These dimensions are given as examples only and should not be taken as limiting. According to the example the wafers 14, 48, 50 and 52 are each 0.590 inches in diameter and exhibit an unelectroded fundamental shear mode frequency of 8.263960 MHz. The electrodes on each wafer are aligned and coupled along the Z crystallographic axis. The electrodes are rectangular and have dimensions of 0.126 inches along the Z crystallographic axis and 0.138 inches along the X crystallographic axis. The electrodes on wafers 14 and 52 are separated by 44.3 mils. The electrode separation on wafers 48 and 50 are 52.2 mils. The resulting resonators exhibit an equivalent motional inductance of 29.8 mh.

The resonators formed on the wafers are each tuned as shown in FIG. 11, but with the electrodes 18 and 20 open-circuited. This introduces an error, due to the mechanical couplings and capacitors $C_O$ for which compensation has been made. The following resonant frequencies were measured:

Resonators 16 and 64 8.141586 MHz.
Resonators 22 and 58 8.140837 MHz.
Resonators 54 and 62 8.140880 MHz.
Resonators 60 and 56 8.140938 MHz.

The coupling capacitors C1, C2 and C3 have respective values of 58 pf., 62 pf., and 58 pf., including the electrostatic capacitances $C_O$ of the electrodes.

With a terminating resistance of 500 ohms the filter achieves a center frequency of 8.141830 MHz with a bandwidth of 3.260 kHz.

Figure 18:
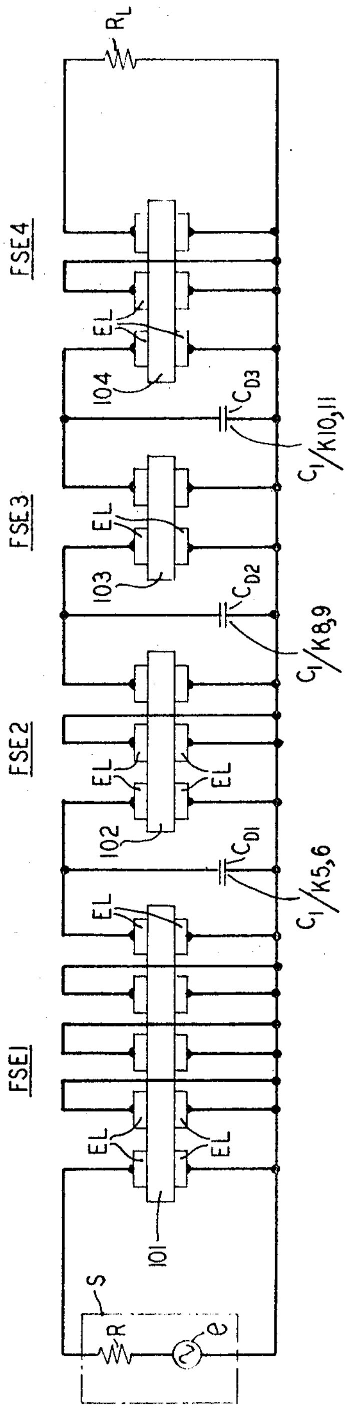
FIG. 18 is a circuit diagram of another filter embodying features of the invention.

The invention may also be embodied as shown in FIG. 18 which shows a more general filter. Here, 5-resonator, 3-resonator, 2-resonator and 3-resonator filter sections FSE1, FSE2, FSE3, and FSE4 are coupled by three capacitors $C_{D1}$, $C_{D2}$ and $C_{D3}$. The values of these capacitors are $C_{1/K_{56}}$, $C_{1/K_{89}}$, $C_{1/K_{10,11}}$. The entire assembly forms a 13-pole filter having a transmission function H(z). The electrodes EL on each of the wafers 101, 102, and 103 form the respective resonators with the wafers. The wafers vibrate in the thickness shear mode. The adjacent resonators formed within each wafer are coupled to each other according to the desired coupling as established by Chebyscheff or Butterworth or any other criteria for 13-coupled resonators. Nevertheless, the coupling between any two resonators, when the two are uncoupled from others, is always less than the maximum in the controlled coupling condition. This limits the bandwidth of the structure to something less than 0.15 percent of the center frequency $f_O$ when the wafers 101, 102, 103, and 104 are made of quartz. The resonators coupled by capacitors $C_{D1}$, $C_{D2}$, and $C_{D3}$ are lowered in frequency by values sufficient to maintain the mesh frequencies $f_O$. This corresponds to compensating for, or creating, series capacitors $-C_1/K_{xy}$ in the Tee circuit of the circuit.

Figure 19:
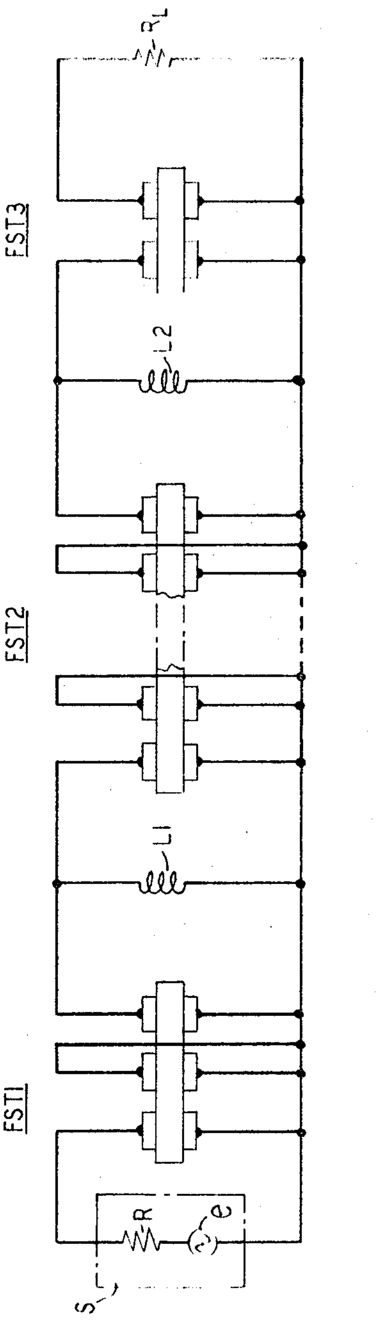
FIG. 19 is a schematic diagram of still another filter embodying features of the invention.

Filters according to the invention may also be embodied as shown in FIG. 19. Here, the couplings between structures, FST1, FST2, and FST3, corresponding to FS1, FS2, FS3, and FS4, are formed by inductors L1 and L2 whose values are $L_1K_{xy}$ where $K_{xy}$ are the desired coupling coefficients between adjacent resonators $x$ and $y$. The inductor coupled resonators are tuned to frequencies $f_O\sqrt{1+K_{xy}}$.

The term thickness shear mode is used as defined in McGraw-Hill Encyclopedia of Science and Technology, 1966, Vol. 10, pages 221 et seq. It includes both parallel face motion and circular face motion about a common axis. The latter is sometimes called the thickness twist mode.

The value of the coupling reactances, namely, the coupling capacitors C1, C2, C3, $C_{D1}$, $C_{D2}$, etc. and the coupling inductors L1 and L2, may have tolerances of plus or minus 10 percent without substantially distorting the bandshape. As a result, the motional capacitance $C_1$, which determines the value of the coupling capacitors and inductors, need not be measured when the resonator is tuned precisely to the frequency $f_0$. The motional capacitance $C_1$ may be measured when the resonator is tuned to the lowered or raised frequency which produces mesh frequencies of $f_0$.

The tuned frequency of each resonator may have a tolerance of plus or minus 10 percent of the desired overall bandwidth.

While FIG. 16 shows the resonators having equal values of equivalent motional inductance $L_1$ and, when the resonators are tuned to $f_0$, equal values of equivalent motional capacitance $C_1$. However the invention as shown in FIGS. 1, 18 and 19 may also be embodied with resonators exhibiting different equivalent motional inductances and capacitances. For example in FIG. 1 one resonator coupled by capacitor C2 may exhibit an equivalent motional inductance of $L_2$ and the other $L_3$. When tuned to $f_0$ the equivalent motional capacitances of these resonators may be $C_2$ and $C_3$ so that $$f_0=\frac{1}{2\pi\sqrt{L_2C_2}}=\frac{1}{2\pi\sqrt{L_3C_3}}$$

For any desired coupling K the value of capacitor C2 is then $$C_2=\frac{\sqrt{C_2C_3}}{K}$$

The capacitor-coupled resonator having the inductance $L_2$ is tuned, when uncoupled, to $$f_2=\frac{1}{2\pi}\sqrt{\frac{1}{L_2}\left(\frac{1}{C_2}-\frac{1}{C_2}\right)}$$

$$=f_0\sqrt{1-K\left(\frac{C_2}{\sqrt{C_2C_3}}\right)}$$

The capacitor coupled resonator having the inductance $L_3$ is tuned when uncoupled to $$f_3=\frac{1}{2\pi}\sqrt{\frac{1}{L_3}\left(\frac{1}{C_3}-\frac{1}{C_2}\right)}$$

$$=f_0\sqrt{1-K\left(\frac{C_3}{\sqrt{C_2C_3}}\right)}$$

The individual resonators may be said to tune their individual mesh to $f_0$ for any value of coupling capacitance.

The above holds true of inductor coupled resonators. Here the value of the coupling inductor $L_K=K\sqrt{L_2L_3}$, or generally $X_k=K\sqrt{X_2X_3}$, for a desired coupling coefficient K. The respective tuning frequencies are $$f_2=f_0\sqrt{1+K\left(\frac{\sqrt{L_2L_3}}{L_2}\right)}$$

or generally $$f_0=\sqrt{1+K\left(\frac{\sqrt{X_2X_3}}{X_2}\right)}$$

$$f_3=f_0\sqrt{1+K\left(\frac{\sqrt{L_2L_3}}{L_3}\right)}$$

or generally $$=f_0\sqrt{1+K\left(\frac{\sqrt{X_2X_3}}{X_3}\right)}$$

Here $X_k$ is the coupling reactance and $X_2$ and $X_3$ the equivalent motional reactances corresponding in type to the coupling reactance.

While embodiments of the invention have been described in detail, it will be obvious to those skilled in the art that the invention may be otherwise embodied without departing from its spirit and scope.

What we claim is:

1. A filter circuit comprising first monolithic crystal filter means having a plurality of resonator means which define a maximum definitively coupled condition and which are coupled to each other more loosely than said maximum definitively coupled condition, second monolithic crystal filter means having a plurality of resonator means which define a maximum definitively coupled condition and which are coupled to each other more loosely than said maximum definitively coupled condition, and reactance means shunted across each of one of the resonator means in each of said crystal filter means, said resonator means which are shunted being tuned, and said reactance means having a value to maintain a coupling between said resonator means less than the maximum definitively coupled condition, said crystal filter means exhibiting when excited equivalent reactances $+X_1$ and $-X_1$ equal to the motional inductances and motional capacitances of said resonator means at the center frequency $f_0$ of said filter circuit, the value of said reactance means being $KX_1$ ±10 percent and including the value of electrostatic reactances of said resonators, K being a desired coupling between said shunted resonators for achieving a given filter characteristic.

2. A filter circuit comprising first monolithic crystal filter means having a plurality of resonator means which define a maximum definitively coupled condition and which are coupled to each other more loosely than said maximum definitively coupled condition, second monolithic crystal filter means having a plurality of resonator means which define a maximum definitively coupled condition and which are coupled to each other more loosely than said maximum definitively coupled condition, and reactance means shunted across each of one of the resonator means in each of said crystal filter means; said resonator means which are shunted being tuned, and said reactance means having a value to maintain a coupling between said resonator means less than the maximum definitively coupled condition, said reactance means being a capacitor, said crystal filter means exhibiting when excited an equivalent motional inductance $L_1$ and an equivalent motional capacitance $C_1$ at a fundamental frequency $f_0=½\pi\sqrt{L_1C_1}$, the value of said capacitor being $C_1/K\pm$ 10 percent less the value of electrostatic capacitances in said shunted resonators.

3. A filter circuit comprising first monolithic crystal filter means having a plurality of resonator means which define a maximum definitively coupled condition and which are coupled to each other more loosely than said maximum definitively coupled condition, second monolithic crystal filter means having a plurality of resonator means which define a maximum definitively coupled condition and which are coupled to each other more loosely than said maximum definitively coupled condition, and reactance means shunted across each of one of the resonator means in each of said crystal filter means, said resonator means which are shunted being tuned, and said reactance means having a value to maintain a coupling between said resonator means less than the maximum definitively coupled condition, said crystal filter means exhibiting when excited equivalent reactances $+X_1$ and $-X_1$ equal to the motional inductances and motional capacitances of said resonator means at the center frequency $f_0$ of said filter circuit, the value of said reactance means being $KX_1\pm10$ percent and including the value of electrostatic reactances of said resonators, K being a desired coupling between said shunted resonators for achieving a given filter characteristic, said reactance $+X_1$ being an inductance $L_1$ and said reactance means being an inductance equal to $1/KL_1$ ±10 percent and including the value of electrostatic reactances of said resonators.

4. A filter circuit comprising first monolithic crystal filter means having a plurality of resonator means which define a maximum definitively coupled condition and which are coupled to each other more loosely than said maximum definitively coupled condition, second monolithic crystal filter means having a plurality of resonator means which define a maximum definitively coupled condition and which are coupled to each other more loosely than said maximum definitively coupled condition, and reactance means shunted across each of one of the resonator means in each of said crystal filter means; said resonator means which are shunted being tuned, and said reactance means having a value to maintain a coupling between said resonator means less than the maximum definitively coupled condition, said circuit exhibiting a given characteristic and passing a given band having a center frequency $f_0$, said reactance means having a value X, said resonator means across which said reactance means are shunted being coupled by a coefficient of coupling K and being tuned when decoupled to a frequency $f_t = f_0\sqrt{1-K}$ ±10 percent of the given band.

5. A filter circuit comprising first monolithic crystal filter means having a plurality of resonator means which define a maximum definitively coupled condition and which are coupled to each other more loosely than said maximum definitively coupled condition, second monolithic crystal filter means having a plurality of resonator means which define a maximum definitively coupled condition and which are coupled to each other more loosely than said maximum definitively coupled condition, and reactance means shunted across each of one of the resonator means in each of said crystal filter means, said resonator means which are shunted being tuned, and said reactance means having a value to maintain a coupling between said resonator means less than the maximum definitively coupled condition, said crystal filter means exhibiting when excited equivalent reactances $+X_1$ and $-X_1$ equal to the motional inductances and motional capacitances of said resonator means at the center frequency $f_0$ of said filter circuit, the value of said reactance means being $KX_1$ ±10 percent and including the value of electrostatic reactances of said resonators, K being a desired coupling between said shunted resonators for achieving a given filter characteristic, said resonator means shunted by said reactance means being tuned, when decoupled by detuning all other resonators on each of said crystal means, to frequencies $f_t = f_0\sqrt{1-K}$ ±10 percent of the band passed by the given characteristic.

UNITED STATES PATENT OFFICE
CERTIFICATE OF CORRECTION

Patent No. 3,585,537 Dated June 15, 1971

Inventor(s) Robert C. Rennick, Warren L. Smith

It is certified that error appears in the above-identified patent and that said Letters Patent are hereby corrected as shown below:

Column 1, line 57, delete "$K_{n}-_{1,n}$" and insert --$K_{n-1,n}$--.

" 4, line 37, delete "$1/2\pi\ L_1C_1$" and insert --$1/2\pi\sqrt{L_1C_1}$ --.

" 8, line 2, delete "$f_o\ \overline{1-K}$" and insert --$f_o\sqrt{1-K}$--.

Signed and sealed this 21st day of May 1974.

(SEAL)
Attest:

EDWARD M.FLETCHER,JR.
Attesting Officer

C. MARSHALL DANN
Commissioner of Patents